June 12, 1956 U. A. MOORES 2,749,765
DUAL HYDRAULIC CLUTCH
Filed Oct. 22, 1954
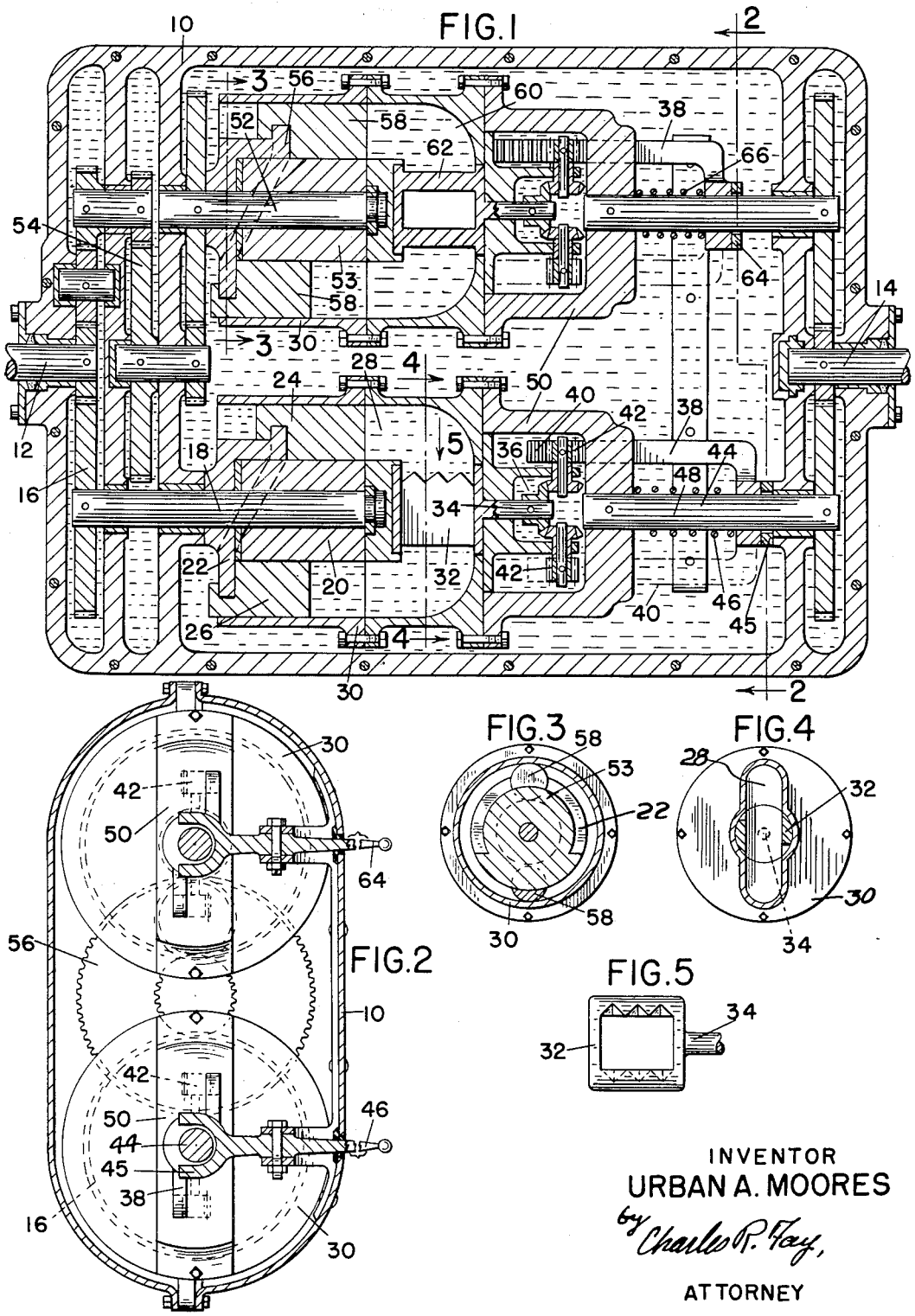
INVENTOR
URBAN A. MOORES
by Charles R. Fay,
ATTORNEY

United States Patent Office 2,749,765
Patented June 12, 1956

2,749,765

DUAL HYDRAULIC CLUTCH

Urban A. Moores, Rutland Heights, Mass.

Application October 22, 1954, Serial No. 463,929

2 Claims. (Cl. 74—361)

This invention is an improvement on the invention disclosed in my copending application Serial No. 445,719 filed July 26, 1954, and the principal object of the present invention resides in the utilization of the hydraulic clutch of the type disclosed in the above identified application in a dual variable torque speed changing clutch gearing providing a variable forward speed, a variable reverse speed and a braking action brought about by the combination of a pair of variable torque, variable speed hydraulic clutches in a single organization; and the provision of a dual hydraulic clutch as above described including a lever for operating each part of the dual system, said levers being operable either singly or simultaneously.

Further objects of the invention include the provision of a pair of variable torque hydraulic clutches preferably mounted in side-by-side relation and geared together to an input shaft and an output shaft, said hydraulic clutches each including a rotary member, a pair of pistons in each member, said pistons being reciprocable in unison but in opposite directions and communicating in a closed path, whereby when the path is unrestricted or open, the pistons may reciprocate without rotary action being impressed on the members or on the output shaft, but when either or both of said paths is closed off or partially closed off, then a rotary action will be impressed on the members through a gearing to be described and as illustrated in my copending application above identified.

Other objects and advantages of the invention will appear hereinafter.

Reference is to be had to the accompanying drawings, in which

Fig. 1 is a vertical sectional view through a device embodying the invention;

Figs. 2, 3 and 4 are sections taken on the respective lines of Fig. 1; and

Fig. 5 is a plan view of one of the valves, looking in the direction of arrow 5 in Fig. 1.

In carrying out the present invention, there is provided a relatively simple but rugged housing indicated generally at 10 and this housing is provided with bearings and seals appropriately housing input shaft 12 and an output shaft 14.

The input shaft 12 is directly geared as at 16 to a shaft 18 properly mounted and journalled. Shaft 18 is fixed to a cam block 20 which is rotated thereby. Said cam block 20 has mounted thereon a spiral cam or the like 22 which is circular in outline as represented in Fig. 3 and is adapted to engage at its edges a pair of pistons 24 and 26. Said pistons are adapted to work simultaneously but oppositely in a closed fluid-filled passage 28.

When shaft 18 is rotating, the cam 22 rotates therewith and causes reciprocation of pistons 24 and 26 by appropriate engaging means as clearly shown. The effect of this reciprocation as so far described is that the fluid will be reciprocated back and forth in the U-shaped passage 28 and no power will be transferred.

The passage 28 is located in a rotary member 30 and the pistons 24 and 26 are located in cylinders therein forming a part of the passage 28.

The passage 28 in the housing 30 is provided with a valve generally indicated at 32 which corresponds to valve 32 in my copending application. This valve is adapted to be rotated to close the passage 28 or to fully open the same and it may be adjusted to any intermediate position in order to partially close the passage. Valve 32 is mounted on a rotary shaft 34 having a gearing generally indicated at 36 by which it may be rotated on an axis parallel to shaft 18.

The means for rotating valve 32 comprises a bracket 38 which may be U-shaped as shown, the legs of the U being provided with racks 40 engaged with pinions 42. Pinions 42 are engaged with the gearing 36 so that when bracket 38 is moved rectilinearly, pinions 42 rotate, thus rotating gearing 36, shaft 34 and valve 32.

Bracket 38 is moved rectilinearly in one direction by means of a spring 46 and in the opposite direction by means of a fork indicated at 45, see particularly Fig. 2, which illustrates the fork of a lever 46 straddling a central shaft 48, so that the latter may rotate within the yoke while bracket 38 is manipulated by means of the lever.

The housing 30 is fixed to the member 40 in turn fixed to shaft 48 and shaft 48 is directly geared with the output shaft 14.

When the valve 32 is closed or partially closed and the passage of the fluid flow in passage 28 is restricted, housing 30 is forced to rotate in order to provide for motion of the pistons and this in turn of course rotates member 50, shaft 48 and the output shaft 14. Any degree of opening or closing of valve 32 between the two extremes is possible and therefore any degree of torque and speed desired may be applied to the output or driven shaft 14.

The input shaft 12 is also geared to a shaft 52 which is similar to that at 18 but through the gearing generally shown at 54 which provides for a reversal of shaft 14 at a different speed thereof. Shaft 52 is fixed to the cam block 53 having the cam 56 thereon, reciprocating pistons 58 in a passage 60 like that at 28 in which is mounted a valve 62 like that at 32. Valve 62 is operated in exactly the same manner by a different lever 64.

When either lever 46 and 64 is released, the respective springs 44 and 66 will automatically re-open the valves and the action afforded by the particular lever operated will cease.

When valve 62 is closed, power is transmitted through the clutch, causing it to rotate in a reverse direction, and this constitutes the reverse gear for the device. However, if valve 62 is only partially closed, the action will result as a braking effect rather than reverse drive described.

Thus the single control valve 62 acts as a reverse drive or brake, depending on how it is used, but to avoid shock and stripping the gears, the gear ratio is reduced and the reverse speed is much slower than the forward speed.

The present invention is an improvement over my copending application, as it avoids power loss found to be inherent therein at high speeds and also offers a smoother operation, reverse gear and a braking action as described above.

Having thus described my invention and the advantages thereof, I do not wish to be limited to the details herein disclosed, otherwise than as set forth in the claims, but what I claim is:

1. A dual variable hydraulic clutch comprising a drive shaft, a closed housing, a pair of members rotatable by the shaft in the housing, a plurality of pistons in each member, means on the shaft to reciprocate the pistons in unison, a fluid passage in each member connecting the pistons, fluid in the passages moved back and forth therein by the pistons, variable valve means to restrict each fluid passage to resist the reciprocation of the pistons and hence to cause the respective members to rotate variably according to the degree of actuation of the valve, and driven means connected to said members, said valves being rotary and gradually opening and closing the fluid passages at a point between the pistons, and means to rotate each valve comprising a U-shaped bracket, gearing located between the legs of the U-shaped bracket, means on each said leg operatively connected to the gearing to actuate the same upon rectilinear motion of the bracket, a hand lever to move each braket in one direction, and a spring to move each lever in the opposite direction.

2. A dual hydraulic clutch comprising a drive shaft, a closed housing, a pair of members rotatable by the shaft in the housing, a plurality of pistons in each member, means on the shaft to reciprocate the pistons in unison, fluid passages connecting the pistons in pairs, fluid in the passages moved back and forth therein by the pistons, valve means to restrict the fluid passage to resist the reciprocation of the pistons and hence to cause the members to rotate, driven means connected to said members, said pistons being parallel to the shaft, and the fluid passages each being of U-shape, the shaft and members being geared together, said gearing including a reversely operating gear for one member.

References Cited in the file of this patent

UNITED STATES PATENTS

| | | |
|---|---|---|
| 886,778 | Dunlap | May 5, 1908 |
| 1,183,322 | Scott | May 16, 1916 |
| 1,924,508 | McCarthy | Aug. 29, 1933 |